(12) United States Patent
Weh et al.

(10) Patent No.: US 11,912,252 B2
(45) Date of Patent: Feb. 27, 2024

(54) HYDRAULIC UNIT FOR A HYDRAULIC VEHICLE BRAKE SYSTEM, AND METHOD FOR ASSEMBLING A HYDRAULIC UNIT

(71) Applicant: Robert Bosch GmbH, Stuttgart (DE)

(72) Inventors: Andreas Weh, Sulzberg (DE); Martin Hagspiel, Rettenberg (DE); Matthias Mayr, Rettenberg (DE); Stefan Kaserer, Ofterschwang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 330 days.

(21) Appl. No.: 17/440,331

(22) PCT Filed: Apr. 22, 2020

(86) PCT No.: PCT/EP2020/061126
§ 371 (c)(1),
(2) Date: Sep. 17, 2021

(87) PCT Pub. No.: WO2020/244840
PCT Pub. Date: Dec. 10, 2020

(65) Prior Publication Data
US 2022/0144238 A1 May 12, 2022

(30) Foreign Application Priority Data

Jun. 7, 2019 (DE) .......................... 102019208397.8

(51) Int. Cl.
*B60T 13/74* (2006.01)
*B60T 8/40* (2006.01)
(Continued)

(52) U.S. Cl.
CPC .......... *B60T 13/745* (2013.01); *B60T 8/4022* (2013.01); *F15B 15/14* (2013.01); *F15B 15/20* (2013.01)

(58) Field of Classification Search
CPC .. B60T 8/4022; B60T 13/745; F15B 15/1414; F15B 15/1471; F15B 2015/1495
See application file for complete search history.

(56) References Cited

U.S. PATENT DOCUMENTS 3,145,628 A * 8/1964 Medley ............... F15B 15/1414
92/244
6,079,797 A 6/2000 Ganzel
(Continued)

FOREIGN PATENT DOCUMENTS

DE 102008059862 A1 4/2010
DE 102014212413 A1 12/2015
(Continued)

OTHER PUBLICATIONS

International Search Report for PCT/EP2020/061126, dated Jul. 3, 2020.

*Primary Examiner* — Kenneth Bomberg
*Assistant Examiner* — Matthew Wiblin
(74) *Attorney, Agent, or Firm* — NORTON ROSE FULBRIGHT US LLP; Gerard A. Messina

(57) ABSTRACT

In order to prevent rotation of a piston of a hydraulic unit of a hydraulic vehicle braking system, a sleeve is provided having axially parallel cylindrical pins constituting rotation prevention elements on its inner circumference, the rear ends of which elements are pressed into axially parallel holes in an inwardly projecting flange of the sleeve, and the front ends of which are inserted into axially parallel blind holes in a diameter step in a mouth of the cylindrical hole in a hydraulic block of the hydraulic unit. A method for assembling the hydraulic unit thus configured is also described.

9 Claims, 3 Drawing Sheets

(51) Int. Cl.
*F15B 15/14* (2006.01)
*F15B 15/20* (2006.01)

(56) References Cited

U.S. PATENT DOCUMENTS

| | | | |
|---|---|---|---|
| 2015/0375727 A1* | 12/2015 | Weh | F16H 57/00 |
| | | | 29/428 |
| 2017/0130792 A1* | 5/2017 | Tandler | B60T 13/741 |
| 2017/0137005 A1* | 5/2017 | Weh | F04B 23/025 |
| 2017/0217418 A1 | 8/2017 | Ganzel | |
| 2018/0345934 A1* | 12/2018 | Weh | F04B 17/03 |
| 2019/0100188 A1 | 4/2019 | Lee | |

FOREIGN PATENT DOCUMENTS

| | | |
|---|---|---|
| DE | 102017114556 A1 | 1/2019 |
| DE | 102017214593 A1 | 2/2019 |
| KR | 20160083269 A | 7/2016 |

* cited by examiner

HYDRAULIC UNIT FOR A HYDRAULIC VEHICLE BRAKE SYSTEM, AND METHOD FOR ASSEMBLING A HYDRAULIC UNIT

FIELD

The present invention relates to a hydraulic unit for a hydraulic vehicle braking system; and to a method for assembling it.

The hydraulic unit is provided for brake pressure buildup and/or for conveyance of brake fluid for a traction control system and/or for brake pressure buildup for external-force braking. Traction control systems are antilock braking systems, automatic traction control systems, and/or vehicle dynamics control systems or electronic stability programs, for which the abbreviations ABS, TCS, and/or VDC/ESP are commonly used. Vehicle dynamics control systems or electronic stability programs are also referred to informally as "anti-skid systems." Traction control systems are conventional and will not be explained here.

BACKGROUND INFORMATION

German Patent Application No. DE 10 2017 214 593 A1 describes a hydraulic unit having a cuboidal hydraulic block that has a cylindrical hole into which is pressed a cylindrical sleeve in which a piston is axially displaceably received. For displacement of the piston, the conventional hydraulic unit has an electric motor that displaces the piston in the cylindrical sleeve via a planetary gearset and a ball screw drive. The ball screw drive is disposed coaxially in the piston, which is embodied as a hollow piston. The electric motor is disposed coaxially with the cylindrical sleeve externally on the hydraulic block, and the planetary gearset is disposed, likewise coaxially with respect to the cylindrical sleeve, between the electric motor and the cylindrical sleeve or the ball screw drive.

SUMMARY

A hydraulic unit according to the present invention is provided in order to generate a brake pressure and/or to convey brake fluid in a hydraulic external-force braking system and/or traction-controlled vehicle braking system. The hydraulic unit can be part of a hydraulic muscle-energy or power-assisted vehicle braking system in which the hydraulic unit serves for traction control, or can be part of a hydraulic external-force vehicle braking system in which the hydraulic unit serves to build up brake pressure for external-force braking and preferably also to build up brake pressure and to convey brake fluid for a traction control system.

The hydraulic unit according to an example embodiment of the present invention has an, in particular, cuboidal hydraulic block made of, in particular, metal, for example of an aluminum alloy. The hydraulic block serves for mechanical attachment and hydraulic interconnection of hydraulic and other components of the vehicle braking system, such as solenoid valves, nonreturn valves, hydraulic reservoirs, and/or damper chambers. "Hydraulic interconnection" means hydraulic connection of the hydraulic components in accordance with a hydraulic circuit diagram of the vehicle braking system. The hydraulic components serve to control brake pressure, "control" including open- and closed-loop control.

The hydraulic block has a cylindrical hole in which a piston is axially displaceably guided. The piston can be axially displaceable directly in the cylindrical hole of the hydraulic block or indirectly, for example in a cylindrical sleeve that is disposed in the cylindrical hole in the hydraulic block. Displacement of the piston causes brake fluid to be forced or drawn out of the cylindrical hole or cylindrical sleeve, with the result that a brake pressure for actuation of hydraulic wheel brakes connected to the hydraulic block can be built up, and/or brake fluid can be conveyed.

In accordance with an example embodiment of the present invention, a sleeve, which surrounds the piston, is disposed nonrotatably at a mouth of the cylindrical hole of the hydraulic block. The sleeve can be recessed into the cylindrical hole or disposed externally on the hydraulic block; preferably it projects a little way into the mouth of the cylindrical hole and otherwise protrudes out from the hydraulic block. The sleeve serves to prevent rotation of the piston; it has a rotation prevention element which is located between the sleeve and the piston and extends in a displacement direction of the piston, and which holds the piston nonrotatably by positive engagement. "In the displacement direction of the piston" means that the rotation prevention element extends in axially parallel fashion or also at an angle to an axial parallel, for example helically. The rotation prevention element is, for example, a pin, a bar, or a profile that projects inward from the sleeve surrounding the piston and engages into a corresponding recess externally on the piston so that the piston is held nonrotatably by positive engagement. The sleeve can also have several rotation prevention elements that are disposed with a regular or irregular distribution around a circumference.

In order to fasten the rotation prevention element in the sleeve, the sleeve has a first receptacle in which a rear end of the rotation prevention element is held. The first receptacle can be, for example, an axially parallel hole internally at a circumferential point on the sleeve, into which the rear end of the rotation prevention element is pressed. The "rear end" refers here to an end of the rotation prevention element which faces away from the hydraulic block. The rotation prevention element projects out of the sleeve at the front, i.e. toward the hydraulic block. The hydraulic block of the hydraulic unit according to the present invention preferably has a second receptacle for the rotation prevention element, which a front end (i.e. an end facing toward the hydraulic block) of the rotation prevention element enters when the sleeve is disposed at the mouth of the cylindrical hole of the hydraulic block.

Refinements and advantageous embodiments of the present invention are disclosed herein.

All the features disclosed in the description and in the figures can be implemented, individually or in principle in any combination, in embodiments of the present invention. Embodiments of the present invention which encompass not all, but rather only one or several, features of an embodiment of the present invention, are possible in principle.

BRIEF DESCRIPTION OF THE DRAWINGS

The present invention will be explained in further detail below with reference to an embodiment shown in the figures.

DETAILED DESCRIPTION OF EXAMPLE EMBODIMENTS

Figure 1:
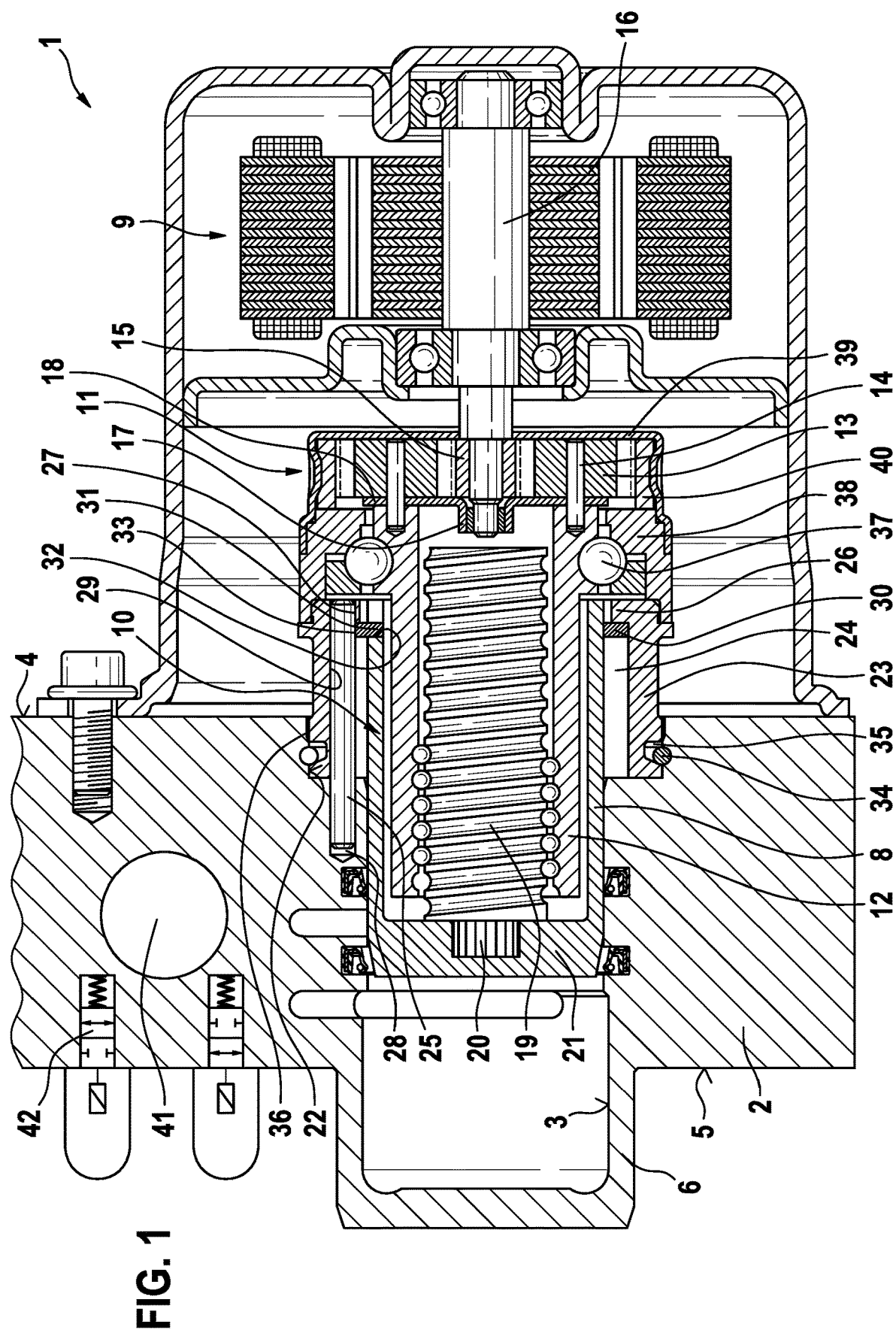
FIG. 1 is a longitudinal section of a hydraulic unit according to an example embodiment of the present invention, axially through a cylindrical hole.

Hydraulic unit 1 according to the present invention, depicted in FIG. 1, is provided for pressure generation in a hydraulic external-force vehicle braking system and/or for pressure generation and for conveyance of brake fluid in a traction-controlled hydraulic vehicle braking system during traction control. Traction control systems of this kind are, for example, antilock braking systems, automatic traction control systems, and/or vehicle dynamics control systems or electronic stability programs, for which the abbreviations ABS, TCS, VDC/ESP are commonly used.

Hydraulic unit 1 according to the present invention has a hydraulic block 2 that serves for mechanical fastening and hydraulic interconnection of hydraulic and other components of the traction control system, such as solenoids, nonreturn valves, hydraulic reservoirs, and damper chambers. The components are disposed on and in hydraulic block 1 and are hydraulically connected to one another by way of drilled holes (not shown) in hydraulic block 2 in accordance with a hydraulic circuit diagram of the external-force vehicle braking system and of the traction control system.

In the embodiment of the present invention which is depicted and described, hydraulic block 2 is a flat, cuboidal metal block made, for example, from an aluminum alloy, which is equipped with orifices to receive the components and is drilled in accordance with the hydraulic circuit diagram of the vehicle braking system and of the traction control system.

Hydraulic block 2 has a cylindrical hole 3 that is installed in hydraulic block 2 perpendicularly to two mutually oppositely located long sides of hydraulic block 2. Cylindrical hole 3 is open on one of the two long sides of hydraulic block 2, which is referred to here as "motor side" 4. The oppositely located long side of hydraulic block 2 is referred to here as "valve side" 5. On it hydraulic block 2 has, in the exemplifying embodiment, a cup-shaped projection 6 that prolongs cylindrical hole 3.

A piston 8 is received axially displaceably in cylindrical hole 3. In the exemplifying embodiment, piston 8 is guided axially displaceably directly in cylindrical hole 3 of hydraulic block 2. Also possible, for example, is a cylindrical hole which is continuous through the hydraulic block 2 and in which a cylindrical sleeve, a running sleeve, or the like, in which piston 8 is axially displaceably guided (not depicted), is disposed. Piston 8 is a cylindrically tubular hollow piston having an open end and a closed end, which is depicted as an individual part in FIG. 2. The closed end of piston 8 is located in cylindrical hole 3 in hydraulic block 2; the open end of piston 8 faces toward an electric motor 9 that is fastened, coaxially with cylindrical hole 3, externally on motor side 4 of hydraulic block 2.

In order to displace piston 8 in cylindrical hole 3, hydraulic unit 1 has electric motor 9, a screw gear 10, and a planetary gearset 11. Screw gear 10 projects a little way into piston 8 (embodied as a hollow piston) and is also coaxial with cylindrical hole 3 and with piston 8. In the exemplifying embodiment, screw gear 10 is a ball screw drive, although this is not obligatory for the present invention. Screw gear 10 converts a rotary drive motion of electric motor 9 into a displacement by which piston 8 is displaced axially in cylindrical hole 3 of hydraulic block 2. The result of the displacement of piston 8 in cylindrical hole 3 is that a brake pressure is built up for actuation of hydraulic wheel brakes (not depicted) which are or become connected via brake lines to hydraulic block 2. During traction control, brake fluid is conveyed by displacement of piston 8 in cylindrical hole 3.

Planetary gearset 11, constituting a mechanical stepdown linkage, is also disposed coaxially with cylindrical hole 3 between electric motor 9 and screw gear 10. A spindle nut 12 of the ball screw drive that constitutes screw gear 10 constitutes a planet carrier for planet gears 13 of planetary gearset 11. Axially parallel pins 14, on which planet gears 13 are rotationally mounted, project from spindle nut 12 from an end face facing toward electric motor 9.

A sun gear 15 is disposed nonrotatably on a motor shaft 16 of electric motor 9, which shaft is rotatably mounted in a bearing bushing 17 on a side of sun gear 15 which is located oppositely from electric motor 9. Bearing bushing 17 is fastened in a bearing plate 18 which is disposed between planet gears 13 and spindle nut 12 and on which pins 14, on which planet gears 13 are rotatably mounted, are fastened. Bearing plate 18 is plate-shaped and has a tubularly cylindrical collar in which bearing bushing 17 is disposed.

A spindle 19 of the ball screw drive that constitutes screw gear 10 is disposed coaxially in piston 8 that is embodied as a hollow piston. To fasten it, spindle 19 has a stem 20 that is coaxial with it and has knurling, and that is pressed into a blind hole in a piston base 21 of piston 8, so that spindle 19 is rigidly connected to piston 8.

Figure 4:
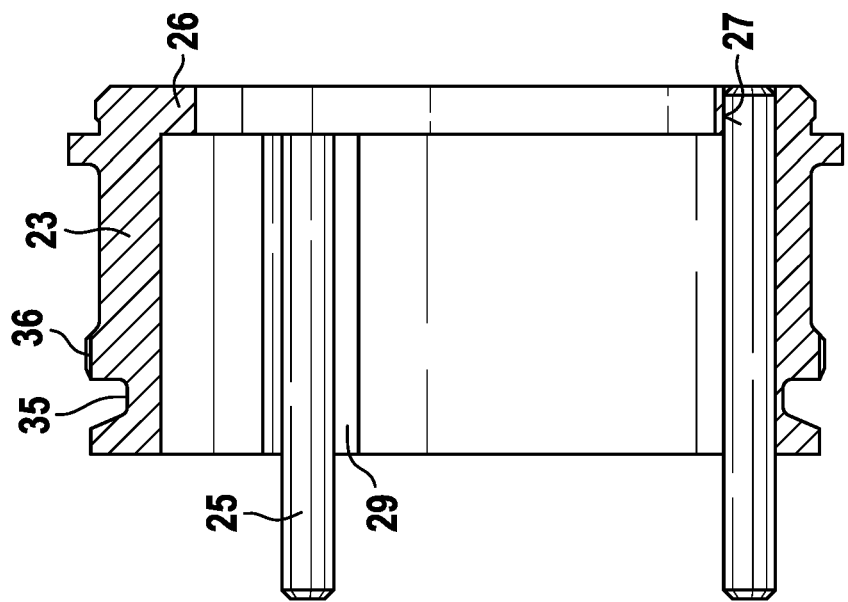
FIG. 4 is an axial section through the sleeve of FIG. 3.
Figure 3:
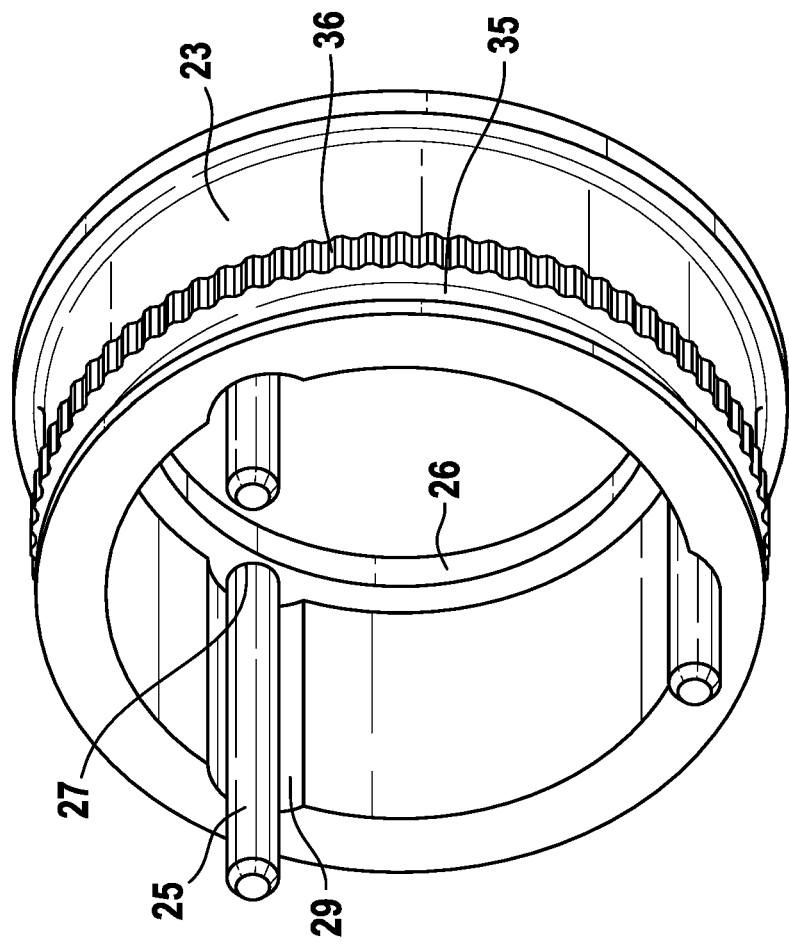
FIG. 3 is a perspective depiction of a sleeve of the hydraulic unit of FIG. 1.

Cylindrical hole 3 has, at a mouth on motor side 4 of hydraulic block 2, a diameter step 22 in which one end of a sleeve 23, which is depicted in FIGS. 3 and 4 as an individual part, is received. Sleeve 23 projects out of cylindrical hole 3 on motor side 4 of hydraulic block 2. It coaxially surrounds piston 8 and has an inside diameter that is greater than an outside diameter of piston 8, so that an annular space 24 surrounding piston 8 in sleeve 23 exists.

Cylindrical pins, constituting rotation protection elements 25, are disposed in annular space 24 axially parallel to cylindrical hole 3 and to sleeve 23 and piston 8. Sleeve 23 has a radially inwardly projecting, encircling flange 26 on its end facing toward electric motor 9, which has axially parallel through holes. The through holes in the inwardly projecting flange 26 of sleeve 23 constitute first receptacles 27 into which ends of the cylindrical pins constituting rotation prevention elements 25 are pressed, so that rotation protection elements 25 are held in sleeve 23. The ends of rotation prevention elements 25 which are pressed into the through holes in the inwardly projecting flange 26 of sleeve 23 are also referred to here as rear ends of rotation prevention elements 25.

The cylindrical pins constituting rotation prevention elements 25 are longer than sleeve 23, so that they project out of a front end, remote from flange 26, of sleeve 23. The front end of sleeve 23 is located in diameter step 22 at the mouth of cylindrical hole 3. Front ends, projecting out of sleeve 23, of rotation prevention elements 25 fit into axially parallel blind holes which are introduced into a base of diameter step 22 of cylindrical hole 3 in hydraulic block 2, and which constitute second receptacles 28 for the front ends of rotation prevention elements 25.

In the embodiment of the present invention which is depicted and described, sleeve 23 has three cylindrical pins constituting rotation prevention elements 25, which are disposed with a regular distribution over a circumference. In the exemplifying embodiment, sleeve 23 has on its inner circumference axially parallel channels 29 in which rotation prevention elements 25 are disposed. Channels 29 are not obligatory for the present invention. More or fewer rotation prevention elements are also possible; the rotation prevention elements can also be disposed with an irregular distribution over the circumference, and they do not need to be cylindrical pins but can also have a different shape (not depicted).

Figure 2:
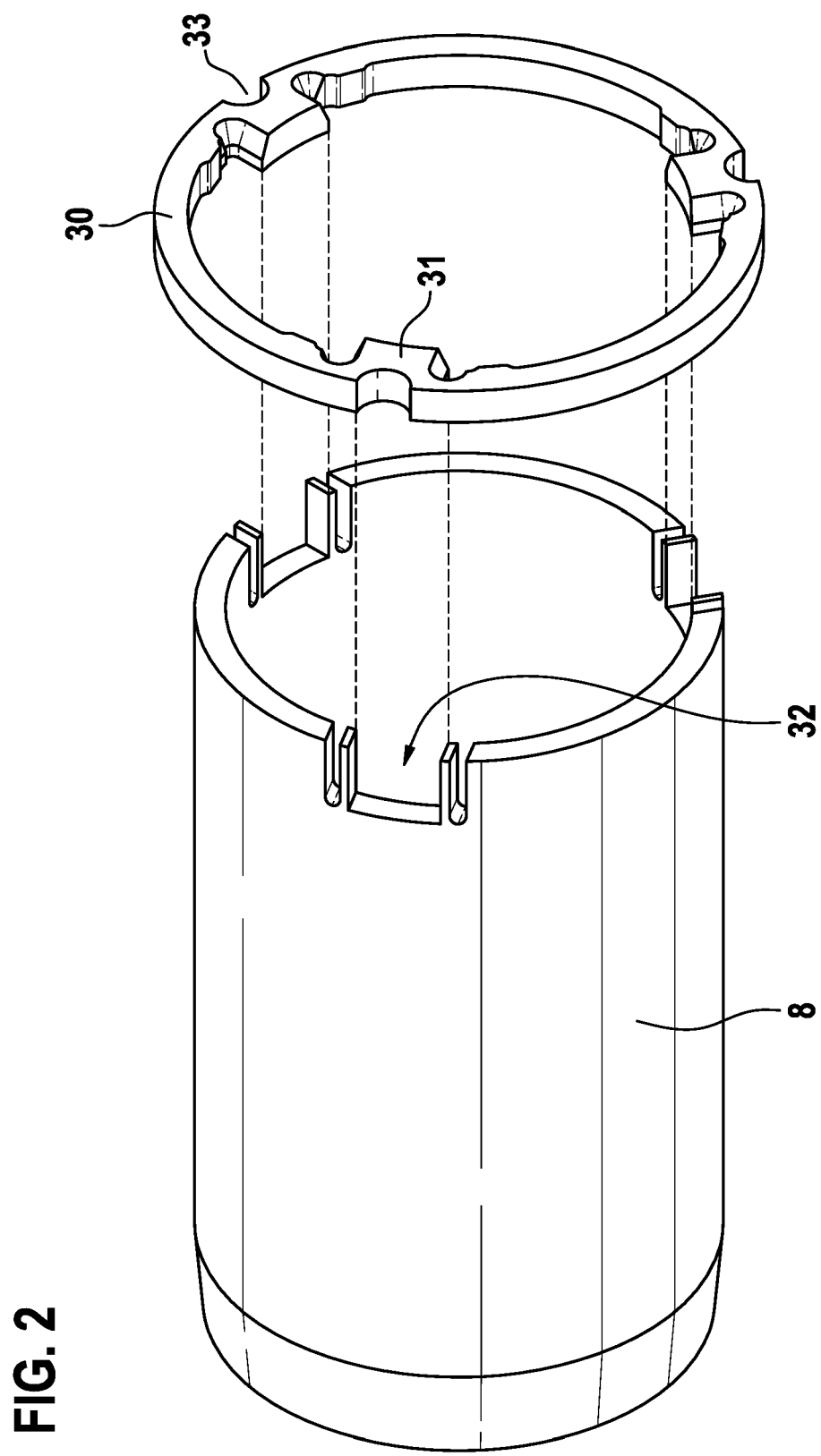
FIG. 2 is a perspective exploded view of a piston of the hydraulic unit of FIG. 1.

For rotation prevention, piston 8 has, at its open end that faces toward electric motor 9, a rotation prevention ring 30 which is depicted in FIG. 2 and has inwardly projecting lugs 31 that engage into corresponding recesses 32 in that end of piston 8 which faces toward electric motor 9, so that rotation prevention ring 30 is nonrotatable with respect to piston 8. Rotation prevention ring 30, which surrounds piston 8 at its end facing toward electric motor 9 in the manner of a flange, has cutouts 33 into which rotation prevention elements 25 engage, so that piston 8 is held axially displaceably and nonrotatably in sleeve 23. In the exemplifying embodiment, cutouts 33 are adapted semicircularly to the cylindrical shape of rotation prevention elements 25. Rotation prevention ring 30 can also be construed as a flange of piston 8.

Sleeve 23 is fastened axially on hydraulic block 2 with an axially resilient spring washer 34 that engages into an externally encircling groove 35 of sleeve 23 and into an internally encircling groove in diameter step 22 in the mouth of cylindrical hole 3 in hydraulic block 2.

Sleeve 23 has, externally on its front end, parallel knurling 36 that, when front end of sleeve 23 is pressed in, shapes itself into the circumference of the diameter step of cylindrical hole 3 so that sleeve 23 is held nonrotatably on hydraulic block 2.

At its rear end that faces toward electric motor 9, sleeve 23 has a ball bearing constituting a rotary bearing 37 for spindle nut 12 of screw gear 10. An outer ring 38 of rotary bearing 37 is connected to sleeve 23 by welding or in another manner. Spindle nut 12 constitutes a drive part, drivable rotationally by electric motor 9 via planetary gearset 11, of screw gear 10, which part is rotatably mounted on sleeve 23 with rotary bearing 37.

A cup-shaped holder 39 for a ring gear 40 of planetary gearset 11 is disposed on, for example welded onto, outer ring 38 of rotary bearing 37.

In the embodiment of the present invention which is depicted and described, hydraulic block 2 has a brake master cylinder orifice 41 in which can be disposed a brake master cylinder piston (not depicted) that is mechanically displaceable with a foot brake pedal (not depicted) or a handbrake lever, via a piston rod, in brake master cylinder orifice 41.

Solenoid valves 42, which are disposed on or in valve side 5 and which serve for closed- or open-loop control of the brake pressure or of wheel brake pressures in the wheel brakes, are depicted in the drawing as circuit symbols. When populated with the components of the traction control system, hydraulic block 2 constitutes hydraulic unit 1.

Sleeve 23, along with the cylindrical pins constituting rotation prevention elements 25, spring washer 34 snapped into the externally encircling groove 35 of sleeve 23, piston 8, screw gear 10, and planetary gearset 11, constitute a subassembly that is preassembled and is then fastened on hydraulic block 2 by pressing the front end of sleeve 23 into diameter step 22 of cylindrical hole 3 in hydraulic block 2, and as a result of spring washer 34 snapping into the groove. As the front end of sleeve 23 is pressed into diameter step 22, the front ends of the cylindrical pins that constitute rotation prevention elements 25 enter the axially parallel blind holes at the base of diameter step 22 in the mouth of cylindrical hole 3 in hydraulic block 2, which form second receptacles 28 for rotation prevention elements 25.

What is claimed is:

1. A hydraulic unit for a hydraulic vehicle braking system, comprising:
    a hydraulic block that has a cylindrical hole in which a piston is axially displaceably guided;
    a sleeve disposed nonrotatably at a mouth of the cylindrical hole and surrounds the piston; and
    a rotation prevention element that is disposed between the sleeve and the piston and extends in a displacement direction of the piston, and which holds the piston nonrotatably by positive engagement, wherein a rear end of the rotation prevention element is held in a first receptacle of the sleeve, and the rotation prevention element projects forward out of the sleeve toward the hydraulic block;
    wherein the sleeve has an inwardly projecting flange having a hole constituting the first receptacle for the rear end of the rotation prevention element.

2. The hydraulic unit as recited in claim 1, wherein the hydraulic block has a second receptacle for the rotation prevention element, into which a front end of the rotation prevention element is inserted.

3. The hydraulic unit as recited in claim 1, wherein the sleeve has axially parallel knurling or oblique knurling which is shaped into a circumference of the cylindrical hole at the mouth of the cylindrical hole.

4. The hydraulic unit as recited in claim 1, wherein the hydraulic unit has a screw gear for displacement of the piston, and a rotationally driven drive part of the screw gear is mounted rotatably on the sleeve.

5. The hydraulic unit as recited in claim 4, wherein the screw gear has a rotary bearing for a sun gear of a planetary gearset, and a planet carrier for the planetary gearset.

6. The hydraulic unit as recited in claim 4, wherein the piston has a flange having a cutout into which the rotation prevention element engages so that the rotation prevention element holds the piston nonrotatably by positive engagement.

7. A method for assembling a hydraulic unit, the hydraulic unit including a hydraulic block that has a cylindrical hole in which a piston is axially displaceably guided, a sleeve disposed nonrotatably at a mouth of the cylindrical hole and surrounds the piston, and a rotation prevention element that is disposed between the sleeve and the piston and extends in a displacement direction of the piston, and which holds the piston nonrotatably by positive engagement, wherein a rear end of the rotation prevention element is held in a first receptacle of the sleeve, and the rotation prevention element projects forward out of the sleeve toward the hydraulic block, wherein the sleeve has an inwardly projecting flange having a hole constituting the first receptacle for the rear end of the rotation prevention element and wherein the hydraulic block has a second receptacle for the rotation prevention element, into which a front end of the rotation prevention element is inserted, the method comprising:
    fastening the rear end of the rotation prevention element in the hole of the inwardly projecting flange of the sleeve;
    disposing the piston in the sleeve;
    disposing the sleeve at the mouth of the cylindrical hole in such a way that the front end of the rotation prevention element enters the second receptacle of the hydraulic block for the rotation prevention element, and the piston enters the cylindrical hole of the hydraulic block.

8. The method as recited in claim 7, wherein the sleeve, the rotation prevention element, a screw gear for displacing the piston, and the piston constitute a subassembly that is preassembled and then attached to the hydraulic block.

9. The method as recited in claim 8, wherein a planetary gearset for rotationally driving the screw gear is a constituent of the subassembly that is preassembled, and for preassembly of the subassembly, the planetary gearset is disposed on the screw gear and the subassembly is then attached to the hydraulic block.

* * * * *